US012673258B2

(12) United States Patent
Tanaami et al.

(10) Patent No.: US 12,673,258 B2
(45) Date of Patent: Jul. 7, 2026

(54) FORCE PLATE AND INFORMATION PROCESSING SYSTEM

(71) Applicant: SINTOKOGIO, LTD., Nagoya (JP)

(72) Inventors: Yoshikane Tanaami, Nagoya (JP); Miyuki Hayashi, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 252 days.

(21) Appl. No.: 18/326,231

(22) Filed: May 31, 2023

(65) Prior Publication Data

US 2024/0001221 A1 Jan. 4, 2024

(30) Foreign Application Priority Data

Jun. 30, 2022 (JP) ................................. 2022-106271

(51) Int. Cl.
*A63F 13/214* (2014.01)
*A63F 13/218* (2014.01)
*A63F 13/50* (2014.01)

(52) U.S. Cl.
CPC .......... *A63F 13/214* (2014.09); *A63F 13/218* (2014.09); *A63F 13/50* (2014.09)

(58) Field of Classification Search
CPC ....... A63F 13/214; A63F 13/218; A63F 13/50
USPC .......................................................... 463/36
See application file for complete search history.

(56) References Cited

U.S. PATENT DOCUMENTS 7,122,751 B1 * 10/2006 Anderson ............. A63F 13/245
200/85 R
7,722,501 B2 * 5/2010 Nicolas .............. A63B 23/0458
482/148

9,526,451 B1 * 12/2016 Berme ................... A61B 5/486
9,541,996 B1 * 1/2017 Baxter .................... G06F 3/017
10,133,343 B2 * 11/2018 Perlin .................... G06F 3/011
10,220,310 B1 * 3/2019 Froy ....................... A63F 13/24
2005/0123171 A1 6/2005 Kobayashi et al.
2009/0258704 A1 10/2009 Asami
2013/0344926 A1 * 12/2013 Claudel ................. A63B 22/16
463/7
2017/0056760 A1 * 3/2017 Lee ....................... A63F 13/214
2018/0318704 A1 11/2018 Ikenoue et al.

FOREIGN PATENT DOCUMENTS

EP 3398666 A1 11/2018
JP 2005-165848 A 6/2005
JP 2008-048932 A 3/2008
(Continued)

OTHER PUBLICATIONS

Yohei Kawasaki et al., "Positional guidance of the center of foot pressure using abdominal haptic representation", Entertainment Computing 2021, Information Processing Society of Japan, pp. 335-339, Aug. 23, 2021.

*Primary Examiner* — Allen Chan

(74) *Attorney, Agent, or Firm* — Harness, Dickey & Pierce, P.L.C.

(57) ABSTRACT

A technique to facilitate continuing the operation through a load applied by a user who proceeds with a picture program is provided. A force plate functions as a controller controlling a game console. The foot pressure includes a transmitting section configured to transmit, when the COP of a user enters a peripheral part of the force plate, an alert signal to an HM display configured to output a picture from the game console.

12 Claims, 3 Drawing Sheets

(56)                  References Cited

FOREIGN PATENT DOCUMENTS

| JP | 2008264195 | A  | 11/2008 |
|----|------------|----|---------|
| JP | 2010-082340 | A  | 4/2010 |
| JP | 2015-160018 | A  | 9/2015 |
| JP | 6363587    | B2 | 7/2018 |
| JP | 6727807    | B2 | 7/2020 |

* cited by examiner

FORCE PLATE AND INFORMATION PROCESSING SYSTEM

This Nonprovisional application claims priority under 35 U.S.C. § 119 on Patent Application No. 2022-106271 filed in Japan on Jun. 30, 2022, the entire contents of which are hereby incorporated by reference.

TECHNICAL FIELD

The present invention relates to a force plate and an information processing system.

BACKGROUND ART

In the fields of rehabilitation medical equipment, games, etc., load detecting devices having a load sensor have conventionally been used. For example, there is a known technique of using, as operation data, a load value detected by a load detecting device on which a user mounts to execute a game program, in the field of games (see, for example, Patent Literature 1).

CITATION LIST

Patent Literature

[Patent Literature 1]
Japanese Patent Application Publication, Tokukai, No. 2008-264195

SUMMARY OF INVENTION

Technical Problem

However, with the conventional technique as above, the user who is absorbed in game operations can fall from the load detecting device. In particular, in a case where a user wears a head-mounted display and uses virtual reality images to play a game, the user is more likely to fall from the load detecting device. When the user falls from the load detecting device, the operation data of the game is lost, and the progress of the game therefore stops. It is difficult for the user to avoid falling from the load detecting device. Such an operational aspect can diminish the fun of playing the game.

An object of an aspect of the present invention is to provide the technique to facilitate continuing the operation through a load applied by a user who proceeds with a picture program.

Solution to Problem

In order for the above problem to be solved, a force plate in accordance with an aspect of the present invention functions as a controller controlling a picture generating device. The force plate includes a transmitting section. The transmitting section is configured to transmit an alert signal to a display. The alert signal is transmitted to the picture generating device or to the display (which outputs a picture generated by the picture generating device). The alert signal is transmitted when the center of foot pressure of a user enters a peripheral part of the force plate.

In addition, in order for the above problem to be solved, an information processing system in accordance with an aspect of the present invention includes: a force plate; and a display configured to display an image responsive to a signal from the force plate.

Advantageous Effects of Invention

According to an aspect of the present invention, it is possible to facilitate continuing the operation through a load applied by a user who proceeds with a picture program.

DESCRIPTION OF EMBODIMENTS

Figures 1, 2:
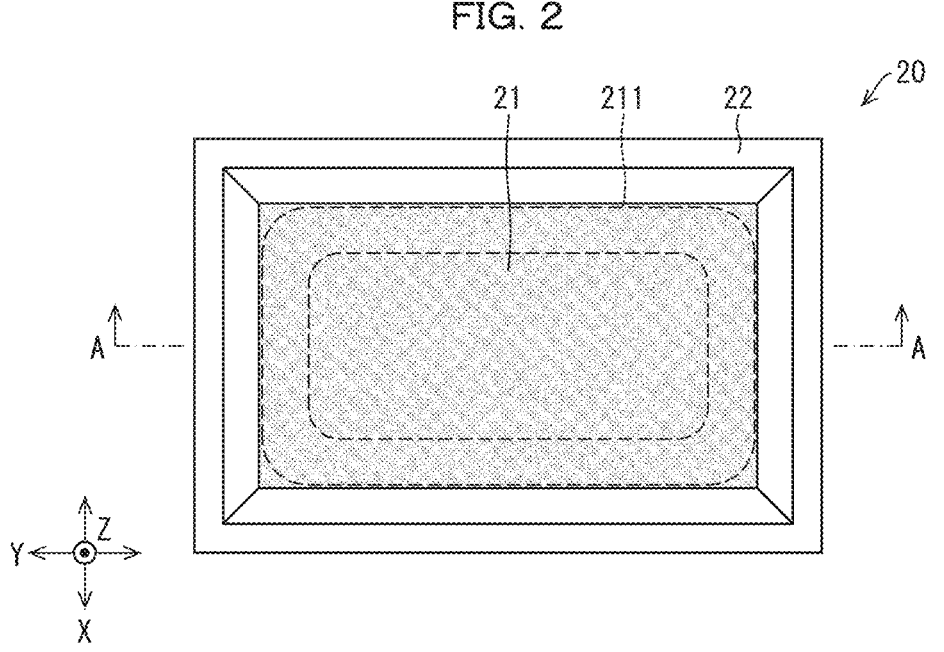
FIG. 1 is a schematic view of the configuration of an information processing system in accordance with Embodiment 1 of the present invention.
FIG. 2 is a schematic plan view of a force plate in accordance with Embodiment 1 of the present invention.

The following description will discuss the embodiments of the present invention in detail, with reference to the drawings. In the drawings, the same reference sign is assigned to elements identical to each other, and the description of such elements is not repeated.

Each of the embodiments is described by taking, as an example, an aspect applied to a game in which virtual reality images are used.

DETAILS OF CONFIGURATION

FIG. 1 is a schematic view of the configuration of an information processing system in accordance with Embodiment 1 of the present invention. The information processing system 1 includes: a game console 10; a force plate 20; a head-mounted display 30; and controller 40, as illustrated in FIG. 1. These components are configured so as to be able to wirelessly communicate with each other. The wireless communications can be performed in accordance with a known standard such as Bluetooth (registered trademark), infrared communications, or a wireless LAN.

The game console 10 proceeds with a game program in response to signals from the force plate 20, the head-mounted display 30, and the controller 40, and outputs, to the head-mounted display 30, a picture signal and an audio signal that are generated. The game console 10 can be formed by a known game console in which virtual reality images are used, and is implemented by, for example, a personal computer (PC) or a programmable logic controller (PLC). The game console 10 corresponds to the picture generating device.

Figure 3:
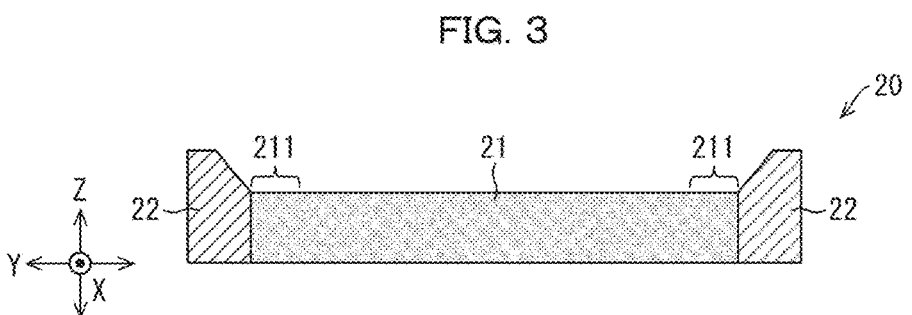
FIG. 3 is a schematic view of a cross section of the force plate along the line A-A in FIG. 2.

FIG. 2 is a schematic plan view of the force plate in accordance with Embodiment 1 of the present invention. FIG. 3 is a schematic view of a cross section of the force plate along the line A-A in FIG. 2.

The force plate 20 includes: a plate body 21; and a ridge 22 disposed around the plate body 21, as illustrated in FIGS. 2 and 3. The plate body 21 is configured to be able to detect, via a force sensor, a load applied by a user. For example, the plate body 21 includes a top board which is rectangular and flat, and has a configuration in which the top board is supported by the force sensors arranged at the corners of the plate body 21. The force sensors are six-axis force sensors, and sense a force FX in an X-axis direction, a force FY in a Y-axis direction, a force FZ in a Z-axis direction, a moment MX about the X axis, a moment MY about the Y axis, and a moment MZ about the Z axis that act on the top board. The plate body 21 has such a configuration, and is therefore capable of detecting the center of foot pressure (COP) of the user, a floor reaction force, and a free moment.

The ridge 22 is provided along the edge of the plate body 21, and forms a bump protruding from the plate body 21 in the vertical direction (Z-axis direction). The ridge 22 is, for example, an elastic member made of polyurethane. As described above, the force plate 20 has a bump in the peripheral part thereof.

The plate body 21 has an attention-seeking area 211 which is set along the entire perimeter thereof. The attention-seeking area 211 will be described later. The force plate 20 further includes a transmitting section. The transmitting section will also be described later.

The head-mounted display 30 is a display device worn by a user at the head, and is an example of the display of the information processing system 1. The head-mounted display 30 is configured to display an image in response to a signal from the transmitting section of the game console 10 or the force plate 20. The head-mounted display 30 is equipped with a sensor that detects the motion of the head of a user wearing the head-mounted display 30. This sensor is, for example, a gyro sensor or an acceleration sensor, and is an acceleration sensor in Embodiment 1. The head-mounted display 30 further incorporates a speaker that provides sound to a user wearing the head-mounted display 30.

The controller 40 is capable of being operated by a user with the user holding the controller 40 in the hand(s). The controller 40 includes components for the user to proceed with a game. For example, the controller 40 includes an operation key such as a button for inputting a signal. For example, the controller 40 is equipped with a sensor such as a gyro sensor or an acceleration sensor for detecting the motion of the hands of the user. This sensor is an acceleration sensor in Embodiment 1.

[Functional Configuration]

Figure 4:
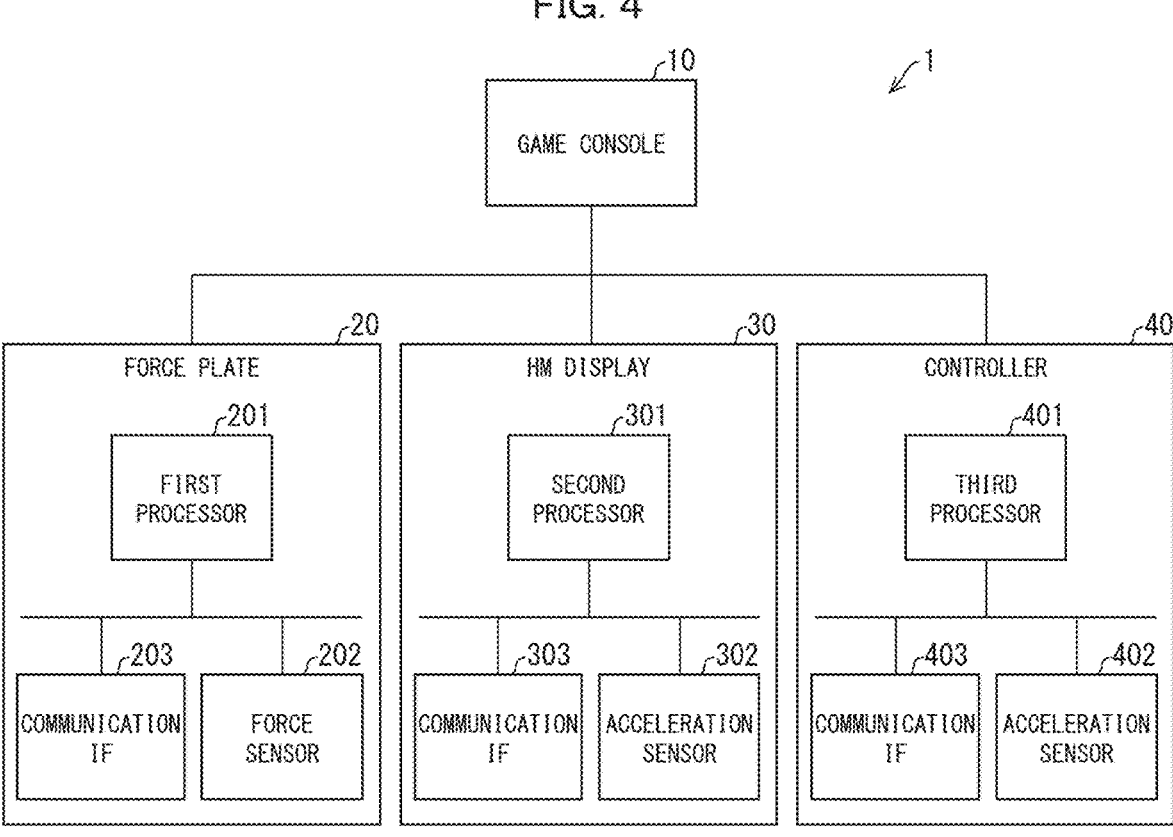
FIG. 4 is a schematic block diagram of the functional configuration of the information processing system in accordance with Embodiment 1 of the present invention.

Next, the functional configuration of the information processing system will be described. FIG. 4 is a schematic block diagram of the functional configuration of the information processing system in accordance with Embodiment 1 of the present invention. The "HM display" in FIG. 4 means the head-mounted display. In the information processing system 1, the game console 10, the force plate 20, the head-mounted display 30, and the controller 40 are configured so as to be able to communicate with each other, as illustrated in FIG. 4.

The game console 10 is constituted by, for example, a processor such as a central processing unit (CPU) or a graphic processing unit (GPU), a memory such as a read only memory (ROM) or a random access memory (RAM), and an interface for communicating with various devices, although these components are not illustrated.

The force plate 20 includes: a first processor 201; a force sensor 202; and a communication IF 203. These components are connected to each other via a bus. Similarly, the head-mounted display 30 includes: a second processor 301; an acceleration sensor 302; and a communication IF 303, and these components are connected to each other via a bus. Correspondingly, the controller 40 includes: a third processor 401; an acceleration sensor 402; and a communication IF 403, and these components are connected to each other via a bus.

Each of the first processor 201, the second processor 301, and the third processor 401 is a CPU or a GPU. Each of the communication IFs 203, 303, and 403 is an interface for communicating with the game console 10, and can be, for example, any of various known networks.

[Example Progress of Game Program]

Described next is an example progress of a game program with which the information processing system 1 proceeds.

First, a user mounts on the force plate 20, wears the head-mounted display 30, and is outfitted with the controller 40.

<Example of Normal Progress of Game Program>

The force sensor 202 of the force plate 20 detects the center of foot pressure (COP) of the user, a floor reaction force, and a free moment. The first processor 201 obtains, on the basis of a detection value from the force sensor 202, information on, for example, the posture of the user on the force plate 20 (whether the user is standing or squatting), the orientation of the user (the orientation of the body of the user in an XY plane), and the motion of the user (staying still, walking, jumping). The information on the posture of the user is, for example, whether the user is standing or squatting. The information on the orientation of the user is, for example, the direction in which the body of the user faces in the XY plane. The information on the motion of the user is, for example, whether the user is staying still, walking (including moving forward and moving backward), or jumping. The first processor 201 outputs the obtained information regarding the user, to the game console 10 via the communication IF 203.

The acceleration sensor 302 of the head-mounted display detects the position and orientation, relative to a reference position, of the head of the user. The reference position as used here refers to the position of the head of the user, the position being located when, for example, the user stands still on the force plate 20 so as to face a predefined front of the force plate. The second processor 301 obtains, on the basis of a detection value from the acceleration sensor 302, information on, for example, the orientation of the face of the user (the direction in which the user looks). The second processor 301 outputs the obtained information on the orientation of the face of the user, to the game console 10 via the communication IF 303.

The acceleration sensor 402 of the controller 40 detects the position and moving direction, relative to a reference position, of the hand(s) of the user. The reference position as used here refers to the position of the hand(s) of the user (the position of the controller 40 with which the hand(s) of the user is outfitted), the position being located when, for example, the user stands still on the force plate 20 so as to face the predefined front of the force plate. The third processor 401 obtains, on the basis of a detection value from the acceleration sensor 402, information on, for example, the position and motion of the hand(s) of the user. The third processor 401 outputs the obtained information on the position and motion of the hand(s) of the user, to the game console 10 via the communication IF 403.

The game console 10 generates, on the basis of the game program and the information obtained from the force plate 20, the head-mounted display 30, and the controller 40, information on picture be displayed on the head-mounted display 30, and outputs the information on a picture that should be displayed in the head-mounted display 30. Thus, since the display is the head-mounted display 30, a picture displayed according to the progress of the picture program (game program) is displayed as the picture corresponding to a direction among all directions that matches the orientation of the user. This configuration is much more effective in enhancing a sense of realism felt by the user. The game console 10 also outputs, according to the game program, information on sound that should be emitted from the speaker, to the head-mounted display 30. The head-mounted display 30 displays the picture on a display and emits the sound from the speaker, on the basis of the information on the picture and the information on the sound from the game console 10.

<Example of Generation of Alert Signal>

The first processor 201 determines whether the detected position of the COP of the user is in the attention-seeking area 211 of the force plate 20. In a case where the detected position of the COP of the user is in the attention-seeking area 211, the first processor 201 generates an alert signal. The alert signal is a signal for notifying the user that the user reaches the attention-seeking area 211 on the force plate 20, i.e., the user is located near the edge of the force plate 20. The first processor 201 transmits the generated alert signal to the head-mounted display 30 via the communication IF 203. The force plate 20 therefore includes a transmitting section for transmitting, when the COP of the user enters the peripheral part of the force plate, an alert signal to the head-mounted display 30 that outputs a picture generated by the game console 10. In Embodiment 1, the first processor 201 corresponds to this transmitting section.

Upon the reception of the alert signal from the force plate 20, the head-mounted display 30 superimposes, on the picture from the game console 10, an image responsive to the alert signal, and displays the superimposed picture.

Figure 5:
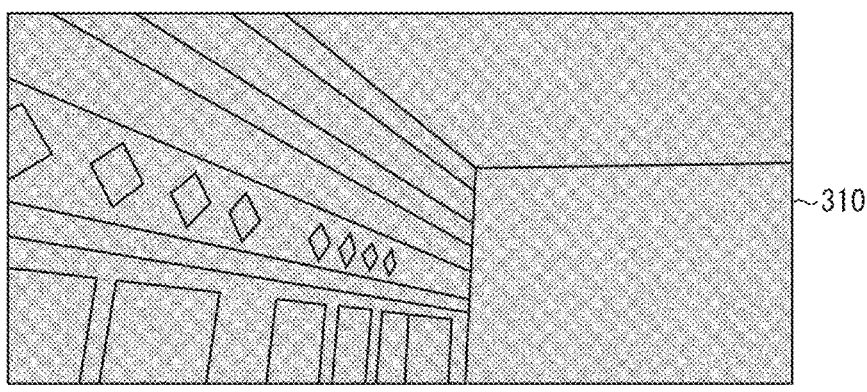
FIG. 5 is a diagram illustrating an example image in a picture program displayed for the user.
Figure 6:
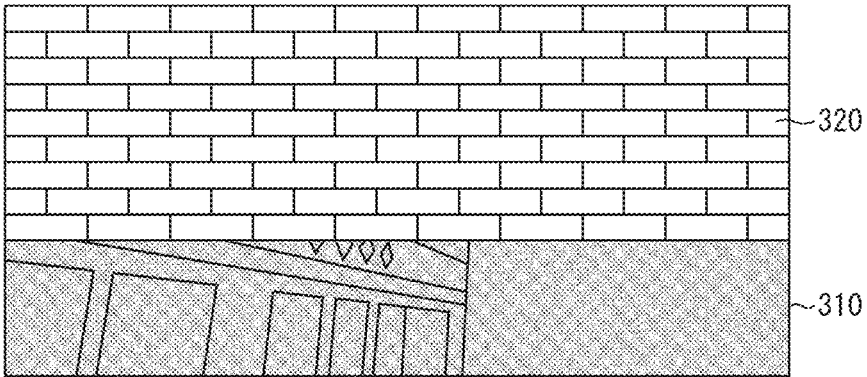
FIG. 6 is a diagram illustrating an example image having an alert image displayed on the image in FIG. 5.

Here is the description of a specific example of the image. FIG. 5 is a diagram of an example image in a picture program displayed for the user. An image 310 illustrated in FIG. 5 is a scene from the game in progress, the scene being based on the information from the game console 10. FIG. 6 is a diagram illustrating an example image having an alert image displayed on the image in FIG. 5. The head-mounted display 30 superimposes, in response to the alert signal, an image 320 which appears to be a wall covering the upper part of the image 310. As described above, the first processor 201 of the force plate 20 transmits to the head-mounted display 30 a signal, as the alert signal, instructing that the image 320, which covers up at least a part of the image 310, be displayed on the head-mounted display 30.

When the user moves inward (toward the center) from the attention-seeking area 211 of the force plate 20 in accordance with the display of the image 320, the first processor 201 stops generating the alert signal. As a result, the display of the image 320 stops, and the image 310 alone is displayed for the user. The display of the image 320 is much more effective in helping the user return to a position on the force plate, the position being appropriate to view the picture in the picture program in progress. It is thus possible for the user to continue to proceed with the game, although the progress of the game is partially restricted due to the display of the image 320.

When the user moves further outward on the force plate 20 despite the display of the image 320, the foot of the user touches the ridge 22 located in the peripheral part of the force plate 20. This enables the user to become aware of being at such a position as to fall from the force plate 20. The ridge 22 thus helps the user return to the central part of force plate 20. As a result, the user moves inward (toward the center) from the attention-seeking area 211 of the force plate 20. It is thus possible for the user to continue to proceed with the game. As described above, the force plate 20 having the ridge 22 in the peripheral part thereof is much more effective in helping the user become aware of the bump during the progress of the picture program to return to an appropriate position on the force plate.

[Main Working-Effect]

With the information processing system 1, it is possible to sense the orientation and balance of the body of the user via the force plate 20. This allows the distinction, based on a bias in the load applied by the user, between forward movement and backward movement for the front-back direction, even in a case of the step motion of the user. It is therefore possible to display for the user a picture which better matches what the user senses.

With the information processing system 1, it is also possible to detect the orientation of the user not only via the force plate 20 but also via the head-mounted display 30. For example, the user has a wider field of view when turning the head to a side of the user while slightly turning the body to the side than when turning the head alone to the side. It is therefore possible to determine a picture across the field of view of the user, the picture better matching the motion of the user, than when using the head-mounted display 30 alone to determine such a picture.

Other Embodiments

In the information processing system 1 described above, some or all of the above-described components of the information processing system 1 may be connected by cable so that wire communications can be achieved. Further, the inclusion of the controller 40 in the information processing system 1 is optional. In a case where the information processing system 1 does not include the controller 40, the signal from the controller 40 regarding the progress of a game can be replaced with, for example, a specific signal (e.g., the position of a load or the number of times of detection) regarding the load, applied by the user, detected by the force plate 20.

In an embodiment of the present invention, when the COP of a user enters an attention-seeking area 211, a transmitting section (first processor) of a force plate 20 may transmit an alert signal to a game console 10. This embodiment advantageously simplifies the configuration and the control regarding communications. In this embodiment, the game console 10 may output, to a head-mounted display 30, a picture in the game and an image responsive to the alert signal that are separate from each other. Alternatively, the game console 10 may generate information on a composite picture formed by combining the image responsive to the alert signal with the picture in the game, and output the composite picture to the head-mounted display 30.

The display of the game console 10 is not limited to the head-mounted display 30, but may be a common display device that enables a person other than the user to also see the picture, such as a liquid crystal panel or an organic EL pane. Similarly, the speaker is not limited to that incorporated in the head-mounted display 30, but may be a speaker that enables a person other than the user to hear the sound, such as an external speaker included in the game console 10 or the common display device.

The transmitting section (first processor) of the force plate 20 may transmit to the game console 10 or the head-mounted display 30 a signal, as an alert signal, instructing that an alert sound be emitted. Such an embodiment in which an alert sound is emitted is much more effective in helping the user return to an appropriate position on the force plate while proceeding with a picture program.

The image or the sound responsive to the alert signal may be generated so as to restrict the movement of the user in a specific direction. For example, the image 320 may only cover a part of the image 310 in a game, the part corresponding to the specific direction in which the user is entering the attention-seeking area 211. In a case where, for example, the user moves to the right to enter the attention-seeking area 211, the image 320 may be an image of a wall or the like that covers the right-side part of the image 310. Further, the image 320 may extend so as to cover a greater part of the image 310 when the user is closer to the edge of the force plate 20. For example, the image 320 may be an image of a wall that is higher or comes nearer when the user is closer to the edge, the wall being displayed in the moving direction of the user.

The inclusion of a ridge 22 in the force plate 20 is optional. Alternatively, the ridge 22 may have a configuration for drawing more attention from the user. For example, the ridge 22 may have a structure for emitting sound in response to the user's touch. Alternatively, it is possible to replace the ridge 22 with another configuration that can draw attention from the user. For example, such a configuration may be a groove that is disposed in the edge part of the plate body 21 and that is set back from the top face of a plate body 21, or may be a group of ridges consisting of a plurality of ridges that are formed in the edge part (e.g., the attention-seeking area 211) in the top face of the plate body 21.

The force plate 20 only needs to be configured as being able to sense the COP of the user, etc. via a force sensor. There is no limitation to the number of the force sensors installed in the force plate 20. Further, the force plate 20 may include two or more plate bodies 21. For example, two plate bodies 21 aligned in the Y direction may constitute a single force plate 20. With such a configuration, in which a plurality of plate bodies independent of each other constitute the force plate 20, it is possible to determine differences between detection values detected by the respective plate bodies and changes, over time, in such detection values. Thus, this configuration more advantageously estimates the posture and the motion of a user with more precision.

The information processing systems of the embodiments of the present invention are applicable not only to games but also other uses in which, on the basis of a particular program, the motion of the body of a user is sensed so that a picture is generated. Examples of such other uses include training for enhancing the user's physical ability, rehabilitation for successfully restoring the user's physical ability, and lessons for improving the user's skill or technique.

As is clear from the above description, the force plates in accordance with the embodiments of the present invention function as a controller controlling a picture generating device, and include a transmitting section that transmits, when the COP of a user enters the peripheral part of the corresponding force plate, an alert signal to the picture generating device or to a display that outputs a picture generated by the picture generating device. In addition, the information processing systems in accordance with the embodiments of the present invention include: the respective force plates in accordance with the embodiments of the present invention; and a display that displays an image responsive to a signal from the corresponding force plate. With the embodiments of the present invention, the input signals from a user via the force plates easily continue. It is therefore possible to facilitate continuing the operation through a load applied by the user who proceeds with a picture program.

The embodiments of the present invention enhance a sense of realism in an experience obtained by a user through the physical activities of the user, and reduce the interruption of such an experience due to the motion of the user. The aspects described above therefore contribute to the enhancement of mental and physical health of people. For example, the aspects are expected to contribute to the achievement of Goal 3, etc. of the Sustainable Development Goals (SDGs) established by the United Nations.

The present invention is not limited to the embodiments, but can be altered variously by a skilled person in the art within the scope of the claims. The present invention also encompasses, in its technical scope, any embodiment derived by combining technical means disclosed in differing embodiments.

The invention claimed is:

1. A force plate that functions as a controller controlling a picture generating device, the force plate comprising:
a top board;
a six-axis force sensor configured to detect forces in three axial directions and moments about three axes that act on the top board, wherein the six-axis force sensor is configured to detect a center of foot pressure of a user, a floor reaction force, and a free moment;
a first processor; and
a transmitting section configured to transmit, when the first processor determines, based on a detection value of the six-axis force sensor, that the center of foot pressure of the user has entered a peripheral part of the force plate, an alert signal to the picture generating device or to a display that outputs a picture generated by the picture generating device, wherein
the first processor obtains, based on the detection value from the six-axis force sensor, information on a posture of the user and information on a motion of the user.

2. The force plate according to claim 1, wherein the display is a head-mounted display.

3. The force plate according to claim 1, wherein the transmitting section is configured to transmit to the picture generating device or to the display a signal, as the alert signal, instructing that an alert sound be emitted.

4. The force plate according to claim 1, wherein the transmitting section is configured to transmit to the picture generating device or to the display a signal, as the alert signal, instructing that an image which covers up at least a part of the picture be displayed on the display.

5. The force plate according to claim 1, wherein the force plate includes a bump in the peripheral part.

6. An information processing system comprising:
the force plate according to claim 1, the force plate including: a top board; a six-axis force sensor configured to detect forces in three axial directions and moments about three axes that act on the top board; and a first processor; and
a display configured to display an image responsive to a signal from the force plate, wherein
the six-axis force sensor is configured to detect the center of foot pressure of a user, a floor reaction force, and a free moment, and
when the first processor determines, based on a detection value of the six-axis force sensor, that the center of foot pressure of the user has entered a peripheral part of the force plate, an alert signal is transmitted to the picture generating device or to a display that outputs a picture generated by the picture generating device, wherein the first processor obtains, based on the detection value from the six-axis force sensor, information on a posture of the user and information on a motion of the user.

7. The information processing system according to claim 6, wherein the display is a head-mounted display.

8. The information processing system according to claim 6, wherein the transmitting section is configured to transmit to the picture generating device or to the display a signal, as the alert signal, instructing that an alert sound be emitted.

9. The information processing system according to claim 6, wherein the transmitting section is configured to transmit to the picture generating device or to the display a signal, as the alert signal, instructing that an image which covers up at least a part of the picture be displayed on the display.

10. The information processing system according to claim 6, wherein the force plate includes a bump in the peripheral part.

11. The information processing system according to claim 7 wherein the head-mounted display includes: a gyro sensor or an acceleration sensor; and a second processor, and the second processor obtains, based on a detection value from the gyro sensor or the acceleration sensor, information on a position and an orientation of a head of the user.

12. The information processing system according to claim 6, further comprising a controller, which is a device capable of being operated by a user with the user holding the controller in their hand(s), wherein the controller includes: a gyro sensor or an acceleration sensor; and a third processor, and the third processor obtains, based on a detection value from the gyro sensor or the acceleration sensor, information on a position and an orientation of the hand(s) of the user.

* * * * *